United States Patent [19]

Boeglin

[11] 3,843,772
[45] Oct. 22, 1974

[54] PRODUCTION OF WHITE POTASSIUM SULFATE CRYSTALS

[75] Inventor: Albert F. Boeglin, Carlsbad, N. Mex.

[73] Assignee: International Minerals & Chemical Corporation, Libertyville, Ill.

[22] Filed: Sept. 14, 1972

[21] Appl. No.: 288,901

[52] U.S. Cl................ 423/551, 423/199, 423/265
[51] Int. Cl.... C01d 5/00, C01d 11/02, C01d 11/04
[58] Field of Search ............ 23/295, 300; 260/458; 423/197, 199, 208, 264, 265, 260, 267, 275, 551, 552

[56] References Cited
UNITED STATES PATENTS

| | | | |
|---|---|---|---|
| 2,647,913 | 8/1953 | Kosmin | 260/458 |
| 3,054,820 | 9/1962 | deJong et al. | 260/458 |
| 3,110,561 | 12/1963 | Henne et al. | 423/199 |
| 3,203,757 | 8/1965 | Henne et al. | 423/552 |
| 3,271,106 | 9/1966 | Nylander | 423/197 |
| 3,513,099 | 5/1970 | Hans | 260/458 |
| 3,578,399 | 5/1971 | Boeglin | 423/199 |
| 3,687,639 | 8/1972 | Barlow et al. | 423/552 |

OTHER PUBLICATIONS

Schonfeldt, Surface Active Ethylene Oxide Adducts, 1969, p. 638–649.

Primary Examiner—Earl C. Thomas
Assistant Examiner—Eugene T. Wheelock
Attorney, Agent, or Firm—James E. Wolber; Peter Andress

[57] ABSTRACT

Potassium sulfate crystals made by the reaction in aqueous medium of potassium chloride with a magnesium sulfate and potassium magnesium double sulfate can be recovered, free of the usual discoloring, and in enhanced crystal size by incorporating in the medium a small amount of a compound of the formula:

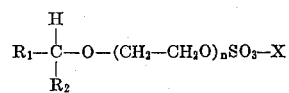

Wherein:
$R_1$ is alkyl,
$R_2$ is H or alkyl,
$R_1 + R_2$ total 8–18 carbon atoms,
$n$ is 1 to 12, and
X is H, Na, K, $Mg^+$, $NH_4$ or triethanol amine.

9 Claims, No Drawings

PRODUCTION OF WHITE POTASSIUM SULFATE CRYSTALS

BACKGROUND OF THE INVENTION

Complex salts containing magnesium sulfate and potassium sulfate occur naturally in many potash ores, such as potash ores found in European deposits and in the Permian Basin of the southwest area of the United States, and mined chiefly in the Carlsbad district of New Mexico. Such complex salts may also be recovered from brines and may be prepared from other potash compounds. It is frequently desirable to separately recover the potassium values and/or magnesium values from these complex salts and many processes to effect the separation have been developed.

The potassium values in langbeinite ores generally are recovered by reacting langbeinite with an aqueous solution of potassium chloride to produce potassium sulfate. Potassium sulfate crystals form in the solution and are recovered. The potassium sulfate mother liquor may be processed by one or another procedure to recover the magnesium values therefrom. Prior processes for the preparation of potassium sulfate from complex salts containing magnesium sulfate and potassium sulfate have found acceptance and are commercially practiced.

Potassium sulfate is also produced from potassium chloride and magnesium sulfate salts such as kieserite. A complex salt containing magnesium sulfate and potassium sulfate (generally leonite, rather than langbeinite) is first formed and then reacted with potassium chloride to crystallize potassium sulfate. Such processes are described, for example, by Henne et al. in U.S. Pat. Nos. 3,110,561 and 3,203,757.

Nylander, in U.S. Pat. No. 3,271,106, describes an improvement in these processes whereby a selected sulfonate surfactant is added to the aqueous medium to greatly increase the size of the potassium sulfate crystals recovered. While this process has been employed commercially for many years, the crystals produced thereby are not the typically white or colorless potassium sulfate, but are discolored due to trapped slimes in the crystal, and the product is generally reddish in color.

Accordingly, it is an object of the present invention to provide an improved method for the preparation of potassium sulfate by the reaction of potassium chloride with potassium-magnesium sulfate salts with the recovery of substantially white or colorless potassium sulfate product.

It is a further object of the invention to provide an improved process for the production of potassium sulfate in which the potassium sulfate is recovered in relatively large crystal size.

These and other objects and advantages of the present invention will be apparent to those skilled in the art as the description of the present invention progresses.

DESCRIPTION OF THE INVENTION

Generally described, the present invention is an improvement in a process for the production of potassium sulfate by the reaction in aqueous medium of potassium chloride with a solid potassium-magnesium sulfate. The improvement comprises effecting the reaction in the presence of selected sulfate surface active agents. It has been discovered, and the present invention is partly based on this discovery, that when the reaction of potassium chloride with a solid complex salt containing magnesium-potassium sulfate in aqueous solution to form potassium sulfate is effected in the presence of the sulfate surface active agents of this invention, the product is white or colorless and a substantially larger amount of the potassium sulfate is produced as relatively large size crystals.

As hereinbefore set forth, complex salts containing magnesium potassium sulfate occur naturally in many potash ores. Examples of the complex salts contemplated as starting materials in the process of this invention are the potassium magnesium double sulfates, langbeinite ($2MgSO_4.K_2SO_4$), leonite ($MgSO_4 . K_2SO_4 . 4 H_2O$), and schoenite ($MgSO_4 . K_2SO_4 . 6 H_2O$). These complex salts may be utilized in pure or impure form, with the higher grades or purities being preferred. As before described, such complex salts may also be produced synthetically from kieserite and potassium chloride.

The reaction of these complex salts with the potassium chloride is effected in an aqueous medium. However, it is desirable that solid salts, such as substantially dry complex salts, be admixed with the potassium chloride. Solid mixtures of two or more of the complex salts may also be used in the process of this invention. The complex salts are used in solid form and they are preferably in sub-divided form smaller than 20 mesh, more preferably smaller than 100 mesh, and still more preferably at least 95 percent smaller than 200 mesh. The solid complex salts may, of course, be slurried in water or other aqueous solution, preferably a brine, before admixing with the langbeinite. The complex salt is used as a solid since it is desirable to maintain the amount of mother liquor from which the reaction product potassium sulfate is removed as low as possible. The invention will hereafter be described using the production of potassium sulfate from naturally occurring langbeinite as a model.

Although in initiating the process only potassium chloride is used in the reaction mixture with the langbeinite or other double sulfate of potassium magnesium, and the brine, a slurry of recycled potassium salts, recovered from the mother liquor of the product, is preferably present in the reaction mixture and is employed once the process has been initiated. Potassium values present in the mother liquor from which the potassium sulfate product is separated are recovered as a mixture of leonite ($K_2SO_4 . MgSO_4 . 4 H_2O$) and potassium chloride.

The process is initiated by admixing the solid complex salt, preferably langbeinite, and potassium chloride with an aqueous solution, which is preferably a brine, substantially saturated with respect to potassium chloride. A potassium sulfate crystal product is formed and separated from the resultant mixture.

As hereinbefore set forth, in accordance with the present invention, when a surface active agent of this invention is present in the reaction mixture, the resultant potassium sulfate is substantially white in color. It is significant that the amount of the +65 mesh size crystals is increased. Accordingly, the process is affected by the presence of the surface active agent. It is, of course, necessary that the agent be present during the reaction of langbeinite with the potassium chloride. The agent is introduced into the reaction zone in any suitable manner. For example, the neutralized agent may be admixed with the langbeinite; it may be admixed with the brine introduced into the reaction zone; it may be admixed with the potassium chloride; it may be introduced directly into the reaction zone; or any other suitable method may be used.

Surface active agents suitable for use in accordance with this invention are materials or mixtures of materials within the formula:

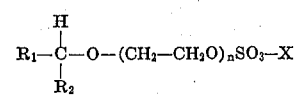

wherein $R_1$ is an alkyl group, $R_2$ is H or an alkyl group, with $R_1$ and $R_2$ together containing 8 to 18 carbon atoms, and preferably 10 to 16 carbon atoms; n is any whole number in the range of 1 to 12, and preferably in the range of 3 to 6; and X is of the group consisting of H, K, Na, $Mg^+$, $NH_4$, and triethanol amine. Since the defined surface active agent will be used in a medium overwhelmingly rich, with respect to the amount of surface active agent, of $Mg^{++}$, $K^+$, and $Na^+$ ions, it will be evident that the cation selected is in no way critical.

Examples of specific materials within the aforesaid class which are useful in accordance with this invention are shown in the following table.

Table I.

| Product | $R_1 + R_2$ | $R_2$ | n | X |
|---|---|---|---|---|
| A | 12–14 | alkyl | 3 | Na |
| B | 11–15 | alkyl | 3 | Na |
| C | 11–15 | alkyl | 3 | $NH_4$ |
| D | 8–10 | H | 3 | Na |
| E | 12 | H | 1 | Na |
| F | 12 | H | 12 | Na |
| G | 12–14 | H | 3 | Na |
| H | 12 | H | 5 | Na |
| I | 12–14 | H | 4 | Na |
| J | 12–15 | H | 3 | Na |
| K | 16–18 | H | 3 | Na |
| L | 12 | H | 3 | $NH_4$ |
| M | 12–14 | H | 4 | $NH_4$ |
| N | 11–15 | H | 3 | $NH_4$ |

The foregoing compounds and mixtures of compounds are available commercially. They can be prepared by reactions which are well known in the art.

The surface active agent is present in the reaction mixture in a small but effective amount. It has been determined that the surface active agent should be present in an amount of at least 250 parts per million by weight based on the total weight of the mixture in the reaction zone. It is more preferable that the agent be present in a concentration of at least 400 parts per million. The upper limit is not as critical as the lower limit. However, concentrations in excess of about 2,000 parts per million are generally uneconomical and, therefore, are not preferred.

The resulting mother liquor from which the product potassium sulfate has been separated will contain dissolved salts comprising magnesium chloride, potassium chloride, potassium sulfate and magnesium sulfate as well as some sodium chloride, the sodium having been introduced with one or more of the starting materials. This mother liquor is preferably concentrated to a point, such that on cooling, the liquor approaches saturation with respect to the magnesium salt carnallite. A salt mixture composed principally of potassium chloride with some leonite, crystallizes after evaporation and cooling of the mother liquor, is separated from the cooled solution, and recycled to the reaction. The recycled potassium salts generally have a $K_2O$ content of about 50 percent. By the term "recycled salts" as used in this description is meant the mixture of potassium chloride and leonite which was separated from the mother liquor from which the potassium sulfate crystals were removed. In order to obtain optimum production of potassium sulfate per unit of langbeinite raw material processed, it may be desired to recycle substantially all of the mixture of recycled salts.

In carrying out a preferred embodiment of the process, the salt mixture containing leonite and potassium chloride, recovered by evaporation and cooling of the mother liquor from which the product has been separated, is admixed with a brine substantially saturated with respect to potassium chloride at a temperature between about 25° C and about 35° C. The brine is suitably prepared by leaching langbeinite ore or sylvite ore or sylvite product obtained from the flotation of sylvinite ore with water. The resulting slurry is rapidly heated to a temperature between about 80° C and about 95° C and any solid phase sodium chloride is immediately separated from the hot solution, for example, by filtration. The resulting solution which is saturated with potassium chloride is cooled to a temperature between about 25° C and about 60° C, preferably between about 30° C and about 55° C, and the resulting slurry is mixed with ground langbeinite in a reaction zone or tank.

Sufficient water is added to the langbeinite reaction mixture to reduce the sodium chloride content below its saturation point in the mixture of products resulting from the reaction. Sufficient dilution is necessary, because as the reaction of the langbeinite proceeds, magnesium chloride is formed, and as the concentration of magnesium chloride in the mixture increases, the solubility of sodium chloride in the solution decreases. Generally, the reaction mixture contains between about 4 and about 5 parts of water per part of langbeinite.

The langbeinite reaction mixture is agitated or stirred until the reaction has proceeded to substantial completion. Generally between about 4 hours and about 6 hours is sufficient time for substantial completion of the reaction. The potassium sulfate salt as crystals is separated from the mother liquor by any suitable means such as, for example, by filtration, decantation, centrifugation, etc. Sodium sulfate is the chief impurity present in the potassium sulfate product. Sodium sulfate does not, however, impair the usefulness of this product in fertilizers.

The mother liquor from which the product is separated is concentrated, for example, by evaporating at a temperature between about 60° C and about 108°C. The mother liquor is concentrated to such point that when the concentrated liquor is cooled over a range of between about 35° C and about 50° C, for example, to a temperature between about 25° C and about 60° C, leonite and potassium chloride are crystallized from the slurry. In a preferred embodiment, the liquor is concentrated at about 98° C in a submerged combustion evaporator to a magnesium chloride concentration between about 15 percent and about 18 percent. The concentrated liquor is cooled to about 50° C and the mixture of salts comprising potassium chloride and leonite, with some sodium chloride contamination, which crystallizes from the cooled slurry are separated from the liquor, for example, by filtration or as an underflow from a conventional thickener apparatus. The liquor from which the solids have been separated has about the same composition as mother liquors rejected from conventional processes in which potassium sulfate is prepared by base exchange. This liquor may be processed for the recovery of magnesium values in accordance with known methods.

The mixture of salts separated from the mother liquor is preferably recycled to the langbeinite reaction step as hereinbefore described. For a more complete understanding of the details of this exemplary process, reference may be made to U.S. Pat. No. 3,271,106.

In order to give a fuller understanding of the invention, but with no intention to be limited thereto, the following specific examples are given:

EXAMPLE I

A test was conducted in which 1,050 grams of refined potassium chloride was slurried into 3,000 grams of water. The slurry was heated to a temperature of 45°–55° C., the specified amount of surface active agent added, and 1,040 grams of ground langbeinite (95 percent - 200 mesh) was stirred into the mixture and the mixture was maintained in an agitating condition for about 5 hours until the reaction was complete. In comparative Test 1 substantially the same conditions were maintained except that a prior art reagent sold under the trademark "Benax" was used.

After a reaction time of about 5 hours the final temperature of the reaction mixture was about 55° C. The potassium sulfate crystals formed in the reaction mixture were separated by filtration, washed with chlorothene and methanol, dried and screened. The results are given below in Table II.

EXAMPLE II

Kieserite ore was leached free of KCl and NaCl, ground to −200 mesh and used in laboratory tests. The leached, ground kieserite analyzed 95 percent kieserite. Tests were made by dissolving 570 g. of refined KCl in 1,500 g. tap water, heating to 50°–55°C., adding the surfactant and then adding 300 or 360 g. of kieserite. Temperature was maintained at 50°–60° C. by water bath. After a period of time sufficient to allow complete reaction of kieserite in most cases, the reaction slurry was filtered. The solids were washed with chlorothene and methanol, dried and screened. The results are shown in Table III.

Table III

| Grams of Kieserite | Reagent | cc of Reagent | Total Time, Hours | Screen Analysis Cumulative % | | |
|---|---|---|---|---|---|---|
| | | | | +28 M | +65 M | +200 M |
| 360 | None | Control | 2.25 | 0 | 0 | 13.7 |
| 360 | Benax | 1.5 | 3.0 | 3.9 | 68.5 | 91.1 |
| 360 | Benax | 2.0 | 4.0 | 36.8 | 73.6 | 90.8 |
| 360 | G | 1.5 | 3.0 | 0.8 | 27.9 | 72.1 |
| 360 | A | 2.5 | 3.0 | 0.4 | 46.7 | 91.1 |
| 360 | G | 1.0 | 3.0 | 0 | 34.1 | 82.5 |
| 360 | A | 1.5 | 3.0 | 0 | 23.4 | 81.8 |
| 360 | B | 2.5 | 5.5 | 14.5 | 66.2 | 91.6 |

I claim:

1. In a process for the production of potassium sulfate by the reaction of potassium chloride with a solid complex salt containing magnesium-potassium sulfate, in aqueous medium, the improvement comprising carrying out the reaction in the presence of at least 250 parts per million of a material of the formula:

$$R_1-\underset{\underset{R_2}{|}}{\overset{\overset{H}{|}}{C}}-O-(CH_2-CH_2O)_nSO_3-X$$

wherein $R_1$ is an alkyl group, $R_2$ is H or an alkyl group, with $R_1$ and $R_2$ together containing 8 to 18 carbon atoms; $n$ is any whole number in the range of 1 to 12; and X is H, K, Na, $Mg^+$, $NH_4$ or triethanol amine.

2. The method in accordance with claim 1 in which X is Na.

3. The method in accordance with claim 1 in which X is K.

4. The method in accordance with claim 1 in which X is $NH_4$.

5. The method in accordance with claim 1 in which $R_1$ and $R_2$ together contain 10 to 16 carbon atoms.

Table II.

| | | TEST NUMBER | | | | | | | |
|---|---|---|---|---|---|---|---|---|---|
| | | 1 | 2 | 3 | 4 | 5 | 6 | 7 | 8 |
| Lbs. of Reagent per ton of $K_2SO_4$ | | 3.6 | 2.3 | 7.2 | 2.9 | 3.6 | 7.2 | 14.4 | 14.4 |
| Reagent Used (Table I) | | Benax* | A | B | A | B | J | I | M |
| Product Screen Analysis, Cumulative % | Mesh | | | | | | | | |
| | 10 | 0 | 0 | 2.9 | 0 | 0 | 0 | 0 | 0 |
| | 20 | 0 | 6.9 | 71.8 | 51.0 | 6.8 | 0.9 | 0 | 0.3 |
| | 28 | 18.5 | 49.3 | 80.6 | 55.2 | 11.5 | 7.2 | 1.0 | 0.8 |
| | 35 | 54.6 | 53.7 | 81.9 | 60.7 | 17.6 | 27.7 | 3.8 | 4.8 |
| | 48 | 75.8 | 55.1 | 82.6 | 66.9 | 33.0 | 43.0 | 27.3 | 23.0 |
| | 65 | 82.2 | 56.6 | 82.8 | 71.0 | 45.2 | 55.6 | 39.3 | 40.5 |
| | 100 | 85.9 | 60.5 | 83.1 | 73.1 | 63.1 | 68.7 | 51.9 | 56.3 |
| | 200 | 90.1 | 75.6 | 85.6 | 80.7 | 85.3 | 85.0 | 71.9 | 75.3 |
| | −200 | 9.9 | 24.4 | 14.4 | 19.3 | 14.7 | 15.0 | 28.1 | 24.7 |
| Color of Crystals | | Reddish | White | White | White | White | White | White | White |

* disodium 4-dodecylated oxydibenzene sulfonate, a prior art surfactant of U.S. Patent No. 3,271,106

6. The method in accordance with claim 5 in which $n$ is in the range of 3 to 6.

7. The method in accordance with claim 6 in which X is Na.

8. The method in accordance with claim 6 in which X is K.

9. The method in accordance with claim 6 in which X is $NH_4$.

* * * * *